United States Patent [19]

Howard et al.

[11] Patent Number: 4,507,551
[45] Date of Patent: Mar. 26, 1985

[54] OPTICAL DETECTION SYSTEM HAVING A DETECTOR LENS COMPRISING A REAR LANDSCAPE LENS

[75] Inventors: James W. Howard, Natick; Irving R. Abel, Lexington, both of Mass.

[73] Assignee: Honeywell Inc., Minneapolis, Minn.

[21] Appl. No.: 474,774

[22] Filed: Mar. 14, 1983

[51] Int. Cl.³ .................................................. H01J 3/14
[52] U.S. Cl. .................................... 250/216; 250/352; 250/353; 350/443
[58] Field of Search ........... 250/353, 352, 216, 370 L; 62/264, 514 R; 350/443

[56] References Cited

U.S. PATENT DOCUMENTS

| | | | |
|---|---|---|---|
| 3,751,664 | 8/1973 | Falbel | 250/216 |
| 3,825,795 | 7/1974 | Redington et al. | 250/353 |
| 4,109,149 | 8/1978 | Abel et al. | 250/353 |
| 4,431,917 | 2/1984 | Gibbons | 250/352 |

*Primary Examiner*—David C. Nelms
*Assistant Examiner*—J. Jon Brophy
*Attorney, Agent, or Firm*—John S. Solakian; Laurence J. Marhoefer

[57] ABSTRACT

An improved optical system for thermal imaging systems using wide field of view optics in conjunction with large detector arrays in which a detector cold shield, system aperture stop and scanning subassembly are placed in substantially the same location such that the size of the scanning optics is minimized and cold shielding efficiency is maximized.

10 Claims, 1 Drawing Figure

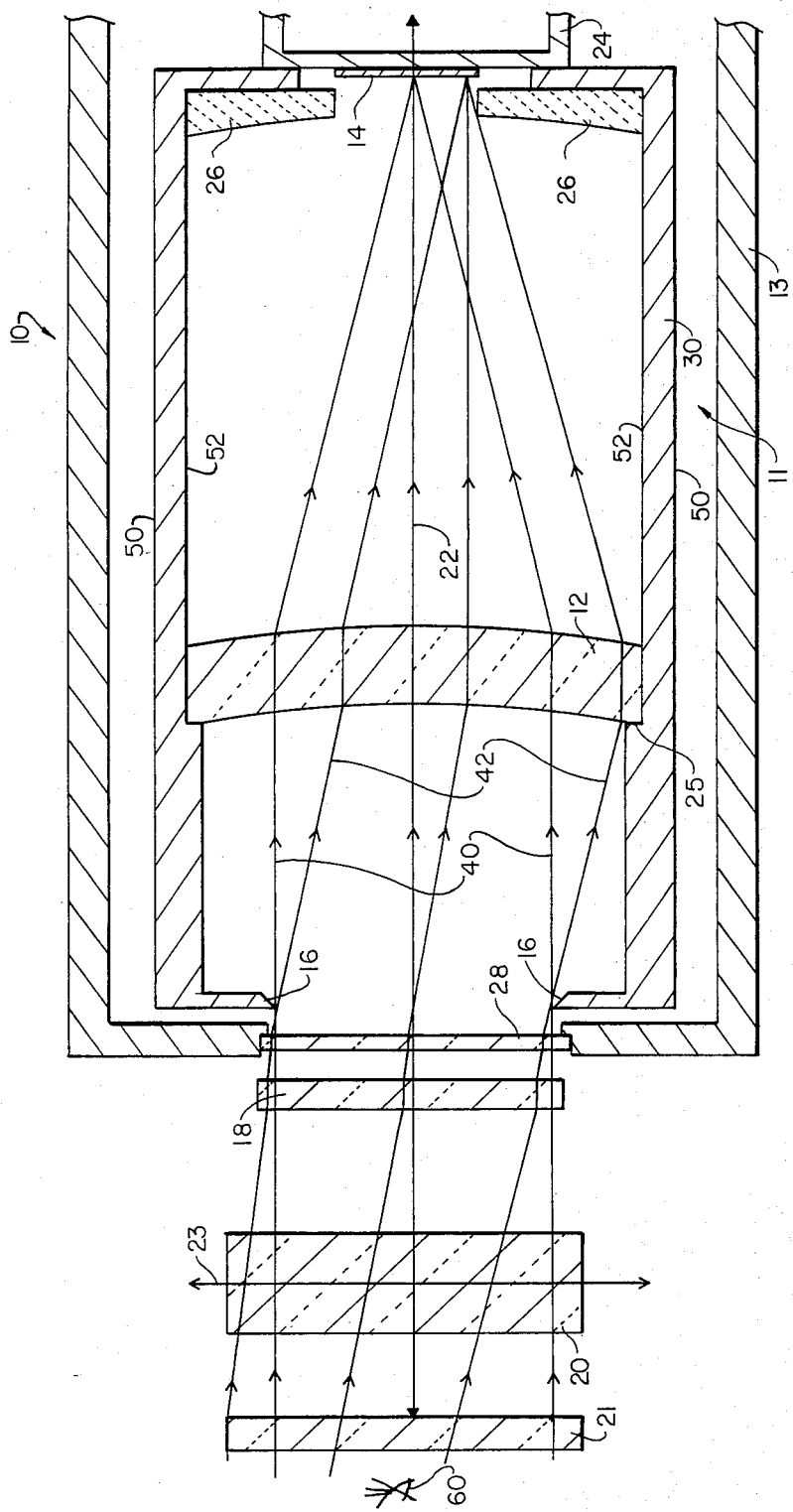

4,507,551

OPTICAL DETECTION SYSTEM HAVING A DETECTOR LENS COMPRISING A REAR LANDSCAPE LENS

BACKGROUND OF THE INVENTION

The present invention generally relates to optical systems, and relates more particularly to focusing lens configurations used in infrared imaging systems having a cooled detector array.

Forward looking infrared imaging systems (or "FLIRS") using high performance semiconductor detector materials usually require cryogenic cooling in order to increase detector sensitivity. In these systems, optimum performance is achieved by "cold shielding" the detector array; i.e., by introducing a cold diaphragm in front of the detector array so that the viewing angle of the detectors to the warm background is limited as far as possible to that required for transmission of the radiation from the scene. Since the radiation to the detector array from outside of this viewing angle is emitted from the cold diaphragm, it is generally negligible, so that the condition of minimum background radiation, and, hence, minimum background noise is achieved.

In first generation infrared imaging systems, the detection system generally either comprises a long column of detectors and one dimensional scanning ("parallel scan") or one or two rows of a few detectors each and two dimensional scanning ("serial scan"). In the case of the former, cold shielding is accomplished by means of a narrow slit in conjunction with a mask of individual detector cold shields placed near the focal plane. In the latter case, the detector array is small so that effective cold shielding can be accomplished by means of a cold diaphragm placed as far as convenient from the detector array. In either system the detector array is mounted in a cryogenic vessel (or "dewar") to achieve optimum performance, and the imaging lens of the system is positioned outside the dewar.

The new (second) generation of FLIRS utilizes a detector array abutting a large charge coupled device (CCD) in conjunction with scanning optics in order to provide improved imaging in two dimensions. This type of system raises additional design constraints. First, the imaging lens (or "detector lens") of the system must be corrected for the wider field of view presented by the detector array as a result of its larger size. Adequate correction usually requires more than one optical element, even if an aspheric element is utilized. Second, the detector array cannot be efficiently cold shielded because a diaphragm in close proximity to the detector array must be large in order to avoid obscuring the field of view of any of the detector elements in the array.

Because two or more optical elements are generally required in a wide field of view system and these are typically outside the dewar, either the size of the scanning optics will be increased because they are farther away from the aperture stop (or its image) of the system, or cold shielding efficiency will be degraded because the aperture stop of the system will be outside the dewar, and consequently warm. Thus, for such wide field of view systems, the aperture stop is ideally placed outside the dewar from the standpoint of minimizing scanner size and achieving aberration correction. On the other hand, for optimum cold shielding the aperture stop should be cold, and, therefore, placed inside the dewar.

It is accordingly a primary object of the present invention to provide an improved optical system for thermal imaging systems using wide field of view optics in conjunction with large detector arrays.

SUMMARY OF THE INVENTION

These and other objects of the present invention are achieved by providing a detector dewar/focusing lens apparatus in which the aperture stop and imaging lens of the system are within the dewar vessel and cooled by the dewar. The aperture stop is placed between the lens and the scanning system in order to minimize the size of the diaphragm within the dewar, or constitute the seat for an optical window or other optical element. In one embodiment, the imaging lens might comprise a single meniscus lens where the centers of curvature of both surfaces are between the lens and the desired scene of interest. In alternative embodiments, it might comprise a combination of optical elements. An aspheric corrector plate (or "Schmidt plate") may be placed at or near the aperture stop in order to correct the spherical aberration of the imaging lens. The detector mosaic or array is placed at the focal plane of the imaging lens.

BRIEF DESCRIPTION OF THE DRAWINGS

The above and other objects of the present invention are achieved in the illustrative embodiment as described with respect to the sole FIGURE which illustrates a cross-section through the optical system of the present invention in which on-axis and off-axis optical paths are shown.

DETAILED DESCRIPTION OF THE PREFERRED EMBODIMENT(S)

Referring to the sole FIGURE, the device of the present invention includes a dewar 10, imaging lens 12, detector array 14, aperture stop 16, aspheric corrector plate 18 and optical scanning subassembly 20, all positioned along optical axis 22, as shown. In one embodiment, dewar 10 may comprise a comprise a coldfinger 24 on which detector array 14 is mounted and an evacuatable outer chamber 11 between dewar vessel 13 and cell 30. Dewar 10 also includes window 28 and a lens cell 30. Cell 30 may be thermally connected to coldfinger 24 such that when detector array 14 is cooled, aperture stop 16 is also cooled. In the alternative, stop 16 may be cooled by a separate cooling mechanism. In one embodiment, cell 30 might also contain a mounting seat 25 for meniscus imaging element 12, or some other multi-element lens.

Schmidt plate 18 is positioned in the path of the optical beams 40 or 42 in order to correct the optical aberrations of the system, particularly those introduced by imaging lens 12. Schmidt plate 18 might be located outside dewar 10 as shown, or might be located at the position of window 28, or at aperture stop 16 within the dewar, or in some other position. Generally, Schmidt plate 18 will be placed at or near aperture stop 16 in order to provide correction of aberrations over a wide field angle.

The optical materials used in elements 18, 16 and 12 are selected to complement the desired spectral sensitivity of detector array 14. As an example, in one embodiment, detector array 14 might comprise mercury cadmium telluride, and elements 12, 16, and 18 might comprise germanium or zinc selenide. The surface curvatures and placement of element 12 with respect to detector array 14 are selected in accordance with well-known techniques of lens system design.

Dewar 10 is constructed using well-known techniques and materials. Cell 30 might be made of copper, stainless steel, kovar or some other material which possesses the appropriate structural and thermal qualities. In general, the exterior surface 50 of the cell is reflective, to reduce the heat load introduced by the warm outer dewar vessel 13. Interior surface 52 absorbs background radiation so that it is not reflected onto the detector array 14.

In one embodiment, a telescope 21, or other foreoptics, might be used to collect and recollimate light from a desired field of view within scene of interest 60. Scanning system 20 scans the field of veiw about a desired axis (for example, axis 23) such that on and off-axis collimated light beams 40 and 42 from scene 60 enter dewar vessel 10 to be imaged by lens 12 onto detector 14. As an example, scanner 20 might consist of a planar scanning mirror which rotates about axis 23 by means of a galvanometer.

The diameter and location of aperture stop 16 are selected to limit light entering dewar 10 from the desired field of view. Since cell 30, aperture stop 16, and lens 12 are cooled, all detecting elements of detector array 14 either see the desired scene of interest 60 over the appropriate field of view, or see the cryogenically cooled cell 30.

At some scan angles the detector array 14, which is itself emissive, may see a reflection of itself off the surfaces of optical elements between the scanning system and the scene of interest, for example, elements of telescope 21. At other scan angles, the detector may see the main housing of the instrument via reflection off lens surfaces. This variations of detected thermal background radiation is called "narcissus". In order to minimize narcissus, an annular reflective spherical element 26 (or "narcissus bowl") may be placed around detector array 14 to direct reflections of the detector array 14 out of the dewar. Generally, the center of curvature of the narcissus bowl 26 lies near the point where the imaging lens 12 images the aperture stop 16.

Having described the invention, what is claimed as new and novel and for which it is desired to secure Letters Patent is:

1. An optical system for scanning a large detector array over a wide field of view within a desired scene of interest, said system having an optical axis and comprising:
   A. a cryogenically cooled vessel ("dewar") located substantially along said optical axis;
   B. imaging lens means located within said dewar and substantially along said optical axis;
   C. an optical detection means located within said dewar and substantially at the position of best focus of said imaging lens means along said optical axis, said detection means having a plurality of detecting elements;
   D. an aperture stop located within said dewar and substantially along said optical axis between said imaging lens means and said scene of interest such that the diameter of the bundle of light rays from said scene of interest is limited by said aperture stop; and
   E. wherein the location of said aperture stop enables the use of an optical scanning device located between said aperture stop and said scene of interest, close to said aperture stop thereby minimizing the size of optical elements within said scanning device.

2. Apparatus as in claim 1 wherein said imaging lens means has a substantially meniscus shape such that the center of curvature of each surface of said lens means lies substantially along said optical axis between said lens means and said scene of interest.

3. Apparatus as in claim 1 wherein a plane parallel plate having an aspheric correction for optical aberrations of said imaging lens means and/or optical system is placed substantially along said optical axis substantially at said aperture stop.

4. Apparatus as in claim 3 wherein said lens means and said plane parallel plate comprise germanium.

5. Apparatus as in claim 3 wherein said plane parallel plate comprises a Schmidt plate.

6. Apparatus as in claim 5 wherein said Schmidt plate comprises germanium.

7. Apparatus as in claim 1 wherein a substantially spherical annular reflective surface (or "narcissus bowl") is located substantially along said optical axis substantially near the focal plane of said imaging lens means, said narcissus bowl having a center of curvature located substantially along said optical axis at or near the point where said imaging lens means images said aperture stop.

8. Apparatus as in claim 1 wherein said detector means comprises a detector array or mosaic having a plurality of detecting elements comprising mercury cadmium telluride.

9. Apparatus as in claim 1 wherein said imaging lens means comprises germanium.

10. Apparatus as in claim 1 wherein said imaging lens means includes a single lens element having a substantially meniscus shape.

* * * * *